(12) United States Patent
Stein

(10) Patent No.: US 7,194,132 B1
(45) Date of Patent: Mar. 20, 2007

(54) METHOD AND SYSTEM FOR DETECTING ANOMALIES IN MULTISPECTRAL AND HYPERSPECTRAL IMAGERY EMPLOYING THE NORMAL COMPOSITIONAL MODEL

(75) Inventor: David Walter Stein, Concord, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 790 days.

(21) Appl. No.: 10/454,116

(22) Filed: Jun. 4, 2003

Related U.S. Application Data

(60) Provisional application No. 60/394,708, filed on Jul. 9, 2002, provisional application No. 60/394,649, filed on Jul. 9, 2002.

(51) Int. Cl.
*G06K 9/46* (2006.01)
*G06K 9/66* (2006.01)
(52) U.S. Cl. .................... 382/190; 382/191; 382/224
(58) Field of Classification Search ............... 382/103, 382/190, 191, 224
See application file for complete search history.

(56) References Cited

U.S. PATENT DOCUMENTS 6,353,673 B1 * 3/2002 Shnitser et al. ............. 382/103
6,587,575 B1 * 7/2003 Windham et al. ........... 382/110

OTHER PUBLICATIONS

Stein, David W. J. ; Modeling Variability In Hyperspectral Imagery Using A Stochastic Compositional Approach; Proceedings of the IEEE International Geoscience and Remote Sensing Symposium, IGARSS '01, Sydney Australia, Jul. 2001.
Stein, Dr. David W. ; Hyperspectral Detection Processing Development; ILIR '01 SSC San Diego In-House Laboratory Independent Research 2001 Annual Report; pp. 63-66; SSC-San Diego Technical Document, May 2002, USA.
Stein, David W. J. ; Stochastic Compositional Models Applied To Subpixel Analysis Of Hyperspectral Imagery; Proceedings of SPIE vol. 4480, Imaging Spectrometry VII, M. Descour and S. Shen eds.; San Diego CA 2001; USA.

* cited by examiner

*Primary Examiner*—Phuoc Tran
(74) *Attorney, Agent, or Firm*—Allan Y. Lee; Michael A. Kagan; Peter A. Lipovsky

(57) ABSTRACT

A method for detecting anomalies from multidimensional data comprises: a) receiving multidimensional data; b) estimating background parameters of a normal compositional model from the multidimensional data; c) estimating abundance values of the normal compositional model from the background parameters and the multidimensional data; d) determining an anomaly detection statistic from the multidimensional data, the background parameters, and abundance values; and e) classifying an observation from the multidimensional data as either a background reference or an anomaly from the anomaly detection statistic.

6 Claims, 3 Drawing Sheets

METHOD AND SYSTEM FOR DETECTING ANOMALIES IN MULTISPECTRAL AND HYPERSPECTRAL IMAGERY EMPLOYING THE NORMAL COMPOSITIONAL MODEL

CROSS-REFERENCES TO RELATED APPLICATIONS

This application claims the benefit of U.S. Provisional Application No. 60/394,708, filed 9 Jul. 2002, and is related by common inventorship and subject matter to the commonly-assigned U.S. Provisional Patent Application No. 60/394,649 entitled "System and Method for Detecting Targets Known up to a Simplex from Multispectral and Hyperspectral Imagery Employing the Normal Compositional Model" filed on 9 Jul. 2002.

BACKGROUND OF THE INVENTION

This invention relates generally to image processing systems and more particularly to an image anomaly detector for target identification.

Hyperspectral sensors are a new class of optical sensor that collect a spectrum from each point in a scene. They differ from multi-spectral sensors in that the number of bands is much higher (twenty or more), and the spectral bands are contiguous. For remote sensing applications, they are typically deployed on either aircraft or satellites. The data product from a hyperspectral sensor is a three-dimensional array or "cube" of data with the width and length of the array corresponding to spatial dimensions and the spectrum of each point as the third dimension. Hyperspectral sensors have a wide range of remote sensing applications including: terrain classification, environmental monitoring, agricultural monitoring, geological exploration, and surveillance. They have also been used to create spectral images of biological material for the detection of disease and other applications.

With the introduction of sensors capable of high spatial and spectral resolution, there has been an increasing interest in using spectral imagery to detect small objects or features of interest. Anomaly detection algorithms are used to distinguish observations from the background when target models are not available or are unreliable.

Anomalies are defined with reference to a model of the background. Background models are developed adaptively using reference data from either a local neighborhood of the test pixel or a large section of the image.

An older method of detecting anomalies from multispectral and hyperspectral imagery is to represent the background imagery using Gaussian mixture models and to use detection statistics derived from this model by applying various principles of detection theory. This approach models each datum as a realization of a random vector having one of several possible multivariate Gaussian distributions. If each observation, $y \in R^n$, arises from one of d normal classes then the data have a normal or Gaussian mixture pdf:

$$p(y) = \sum_{k=1}^{d} \omega_k N(\mu_k, \Gamma_k)(y), \quad \omega_k \geq 0, \quad \sum_{k=1}^{d} \omega_k = 1, \quad \text{[Eqn. 1]}$$

where $\omega_k$ is the probability of class k and $$N(\mu_k, \Gamma_k)(y) = \frac{1}{(2\pi)^{n/2}|\Gamma_k|^{1/2}} \exp\left(\frac{-1}{2}(y-\mu_k)^t \Gamma_k^{-1}(y-\mu_k)\right)$$

is the normal probability density function having mean $\mu_k$ and covariance $\Gamma_k$. The parameters $\{(\omega_k, \mu_k, \Gamma_k) | 1 \leq k \leq d\}$ are typically estimated from the imagery using defined clusters, the expectation maximization algorithm or related algorithms such as the stochastic expectation maximization algorithm. Anomaly detection may then proceed by the application of the generalized likelihood ratio test (GLRT) for an unknown target. Anomaly detection is also accomplished by classifying each pixel as emanating from one of the d classes—the maximum a posteriori (MAP) principle is one approach to classification—and applying the GLRT for an unknown target to the classified data. See, for example, D. W. J. Stein, S. G. Beaven, L. E. Hoff, E. M. Winter, A. P. Schaum, A. D. Stocker, "Anomaly Detection From Hyperspectral Imagery," *IEEE Signal Processing Magazine*, January 2001.

Another older approach to anomaly detection is based on the application of the linear mixture model. This model accounts for the fact that pixels in an image are often overlaid with multiple materials so that an observation may not belong to a class that can be identified with a particular substance. The linear mixture model represents the observations, $y_i \in R^n$, by $$y_i \eta + \sum_{k=1}^{d} a_{ki} \varepsilon_k \text{ such that } c.1 \Big) 0 \leq a_{ki}, \text{ and } c.2 \Big) \sum_{k=1}^{d} a_{ki} = 1 \quad \text{Eqn. 2]}$$

where, d is the number of classes, $\epsilon_k \in R^n$, is the signature or endmember of class k, $a_{ki}$ is the abundance of class k in observation $y_i$ and $\eta \sim N(\mu_0, \Gamma_0)$ is an additive noise term with normal probability distribution function (pdf) of mean $\mu_0$ and covariance $\Gamma_0$. Techniques have been developed for estimating the endmembers from the imagery. Given the endmembers, the abundance values are obtained as the solution to a constrained least squares or a quadratic programming problem. Anomaly detection statistics have been based on the unmixing residual or the identification of endmembers that represent anomalous classes (see Stein et al. supra).

Spectra from a class of material are often better modeled as random rather than as fixed vectors. This may be due to biochemical and biophysical variability of materials in a scene. For such data, neither the linear mixture model nor the normal mixture model is adequate, and better classification and detection results may accrue from using more accurate methods. Stocker et al. [A. D. Stocker and A. P. Schaum, "Application of stochastic mixing models to hyperspectral detection problems," *SPIE Proceedings* 3071, *Algorithms for Multispectral and Hyperspectral Imagery III*, S. S. Shen and A. E. Iverson eds. August 1997.] propose a stochastic mixture model in which each fundamental class is identified with a normally distributed random variable, i.e.

$$y_i = \sum_{k=1}^{d} a_{ik}\varepsilon_k \text{ such that } \varepsilon_k \sim N(\mu_k, \Gamma_k), \qquad [\text{Eqn. 3}]$$

$$a_{ik} \geq 0, \text{ and } \sum_{k=1}^{d} a_{ik} = 1.$$

They estimate the parameters of the model by quantizing the set of allowed abundance values, and fitting a discrete normal mixture density to the data. More precisely, let $\Delta=1/M$ denote the resolution of the quantization. Then the set of allowed coefficient sequences is $$A = \left\{(a_1, \ldots, a_d) \,\middle|\, \sum_{j=1}^{d} a_j = 1 \text{ and } a_j \in \{0, \Delta, \ldots, (M-1)\Delta, 1\}\right\}.$$

For each $\vec{a} = (a_1, \ldots, a_d) \in A$ define $$\mu(\vec{a}) = \sum_{j=1}^{d} a_j \mu_j \text{ and } \Gamma(\vec{a}) = \sum_{j=1}^{d} a_j^2 \Gamma_j. \qquad [\text{Eqn. 4}]$$

Then the observations are fit to the mixture model $$p(y) = \sum_{\vec{a} \in A} \rho_{\vec{a}} N(\mu(\vec{a}), \Gamma(\vec{a}))(y) \qquad [\text{Eqn. 5}]$$

The fitting is accomplished using a variation of the stochastic expectation maximization algorithm such that Eqn. 4 is satisfied in a least squares sense. The authors demonstrate improved classification in comparison with clustering methods using three classes, and they demonstrate detection algorithms using this model. They note, however, that the method is impractical if the data are comprised of a large number of classes or if $\Delta$ is small, as the number of elements of A, which is given by:

$$|A| = \frac{(M+1)\ldots(M+d-1)}{(d-1)!} \qquad [\text{Eqn. 6}]$$

becomes very large. Furthermore, quantizing the allowed abundance values leads to modeling and estimation error.

These unresolved problems and deficiencies are clearly felt in the art and are solved by this invention in the manner described below.

SUMMARY OF THE INVENTION

A method for detecting anomalies from multidimensional data comprises: a) receiving multidimensional data; b) estimating background parameters of a normal compositional model from the multidimensional data; c) estimating abundance values of the normal compositional model from the background parameters and the multidimensional data; d) determining an anomaly detection statistic from the multidimensional data, the background parameters, and abundance values; and e) classifying an observation from the multidimensional data as either a background reference or an anomaly from the anomaly detection statistic.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
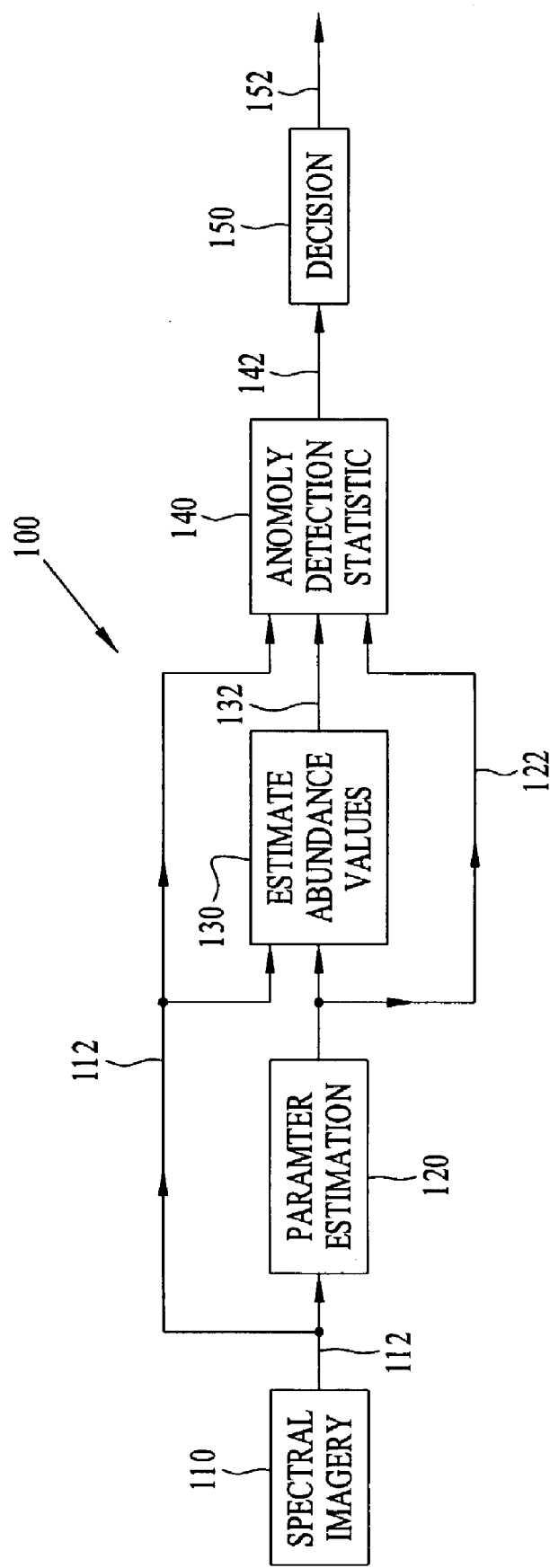
FIG. 1 is a block diagram illustrating the Normal Compositional Model Anomaly Detector embodying various features of the present invention.
Figure 2:
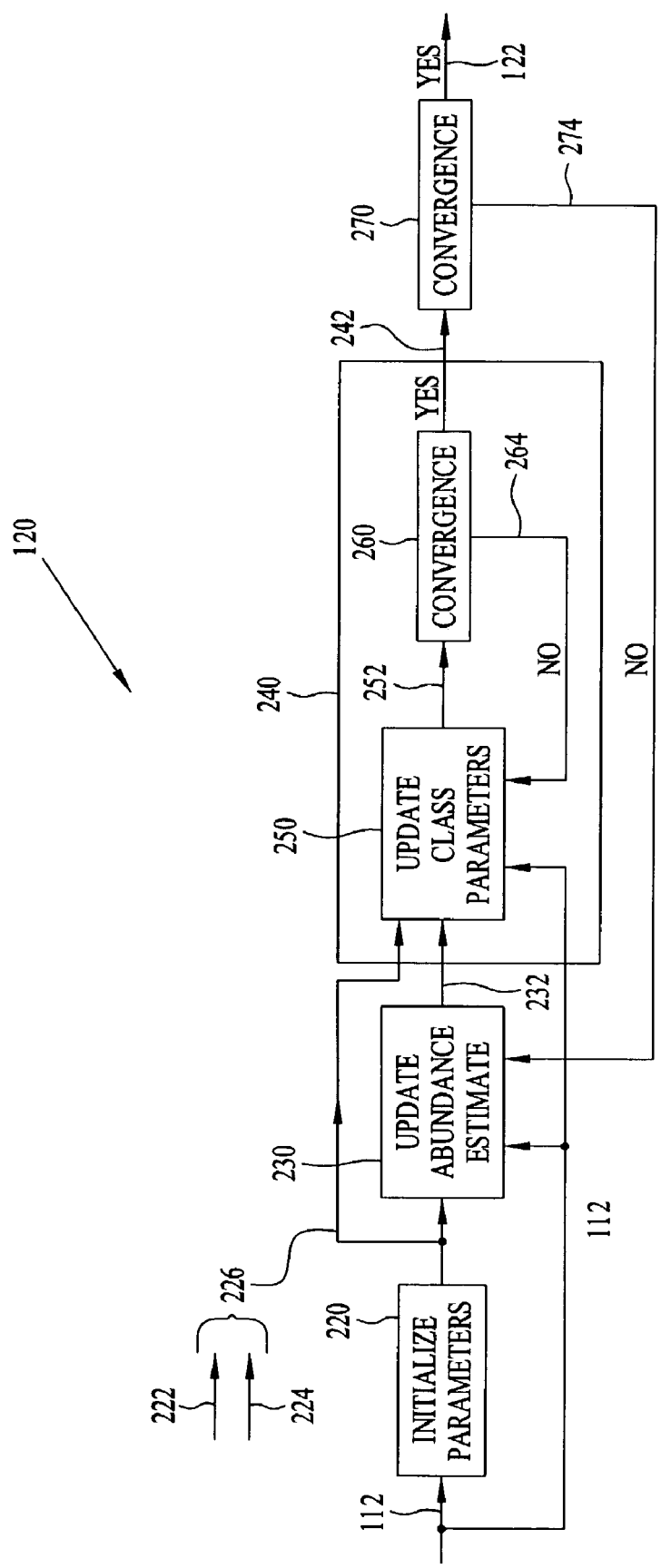
FIG. 2 is a block diagram of a flowchart illustrating the parameter estimation method embodying various features of the present invention.
Figure 3:
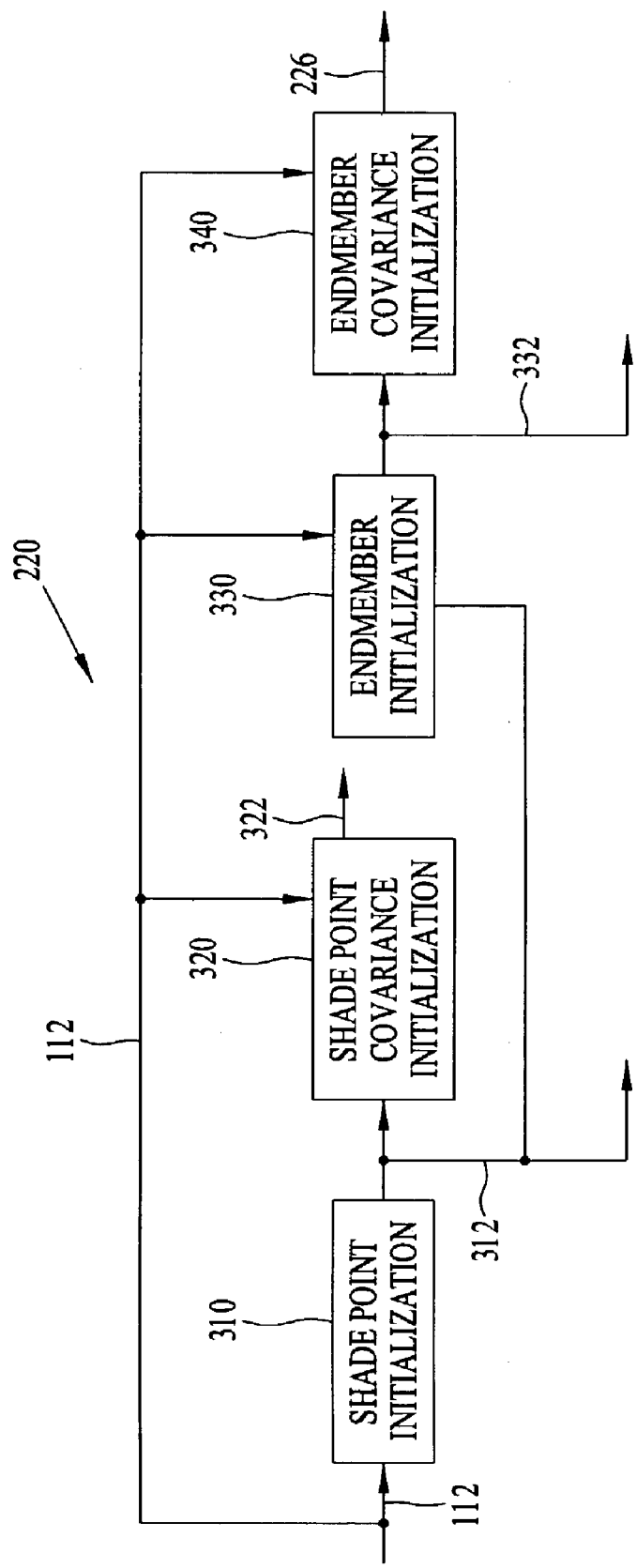
FIG. 3 is a block diagram illustrating the method of this invention for initializing the endmember classes.

The invention is used to detect anomalies in spectral imagery. An embodiment of the invention is operated as shown in FIGS. 1–3. As shown in FIG. 1, the embodiment has four major components: estimation of the parameters of the normal compositional model (NCM), estimation of the abundance values of the classes of the NCM, computation of the detection statistic, and application of a decision criterion to distinguish anomalies from background based on the values of the detection statistic. These steps are elucidated below.

1. Normal Compositional Model

The normal compositional model represents each observation $y_i \in R^n$ as:

$$y_i = c\eta + \sum_{k=1}^{d} a_{ki}\varepsilon_k \text{ such that } c.1\bigg) 0 \leq a_{ki}, \text{ and } c.2.a\bigg) \sum_{k=1}^{d} a_{ki} = 1 \text{ or } c.2.b\bigg) \sum_{k=1}^{d} a_{ki} \leq 1, \qquad [\text{Eqn. 7}]$$

where $\varepsilon_k, \eta \in R^n$ are random vectors such that $\varepsilon_k \sim N(\mu_k, \Gamma_k)$, $\eta \sim N(\mu_0, \Gamma_0)$ and $c=0,1$. Constraint c.2.b may be used in place of c.2.a to account for variations in scale or as in remote sensing, scalar variations in illumination. Applied to remote sensing data, $\eta$ models path radiance, additive sensor noise, and other additive terms. By choosing c=0, and constraints c.1 and c.2.a, the model reduces to the Schaum-Stocker model (Eqn. 3). Although, with this choice of parameters and constraints this embodiment has advantages over the Schaum-Stocker approach since the estimation procedure does not confine the abundance values to preselected quantized values. Therefore, it is not restricted to a small number of classes and it provides more accurate estimates of class parameter and abundance values. This model reduces to the linear mixing model by choosing $\Gamma_k=0$ for all $1 \leq k \leq d$ and c=1, although the parameter estimation technique described below will not refine initial estimates of the $\mu_k$ in this case. It does, however, provide a maximum likelihood approach to estimating the parameters of the distribution of $\eta$. Furthermore, by imposing the constraints c.2.a and $a_{ki}=0,1$ for each $1 \leq i \leq N$, exactly one of $a_{ki}=1$, and the model encompasses the Gaussian mixture model. Whereas specialized constraints applied to the parameters of the NCM reduce it to the older models, in general, without imposing special constraints, the NCM provides a model having higher likelihood than these alternatives.

2. Parameter Estimation

The parameter estimation module is illustrated in FIG. 2 and described below.

A. Initialization

The initialization module is depicted in FIG. 3. The mean value of the additive term $\eta$ is obtained as a virtual shade point, and the covariance of the additive term is estimated as the sample covariance of a cluster of points near $\eta$. Initial estimates of the class means are obtained by applying deterministic linear unmixing techniques to determine a set of endmembers. Several methods of estimating endmembers are available. Clusters containing a prescribed number of points near each endmember are defined, and an initial estimate of each class covariance is obtained as the sample covariance of the corresponding cluster.

B. Updating Abundance Estimates (UA)

For given parameters $(\mu_k, \Gamma_k)$, $1 \leq k \leq d$, and given abundances $\alpha_i = (a_{1i}, \ldots, a_{di})$, let $$\mu(\alpha_i) = \sum_{k=1}^{d} a_{ki} \mu_k \qquad \text{[Eqn. 8]}$$

and $$\Gamma(\alpha_i) = \sum_{k=1}^{d} (a_{ki})^2 \Gamma_k. \qquad \text{[Eqn. 9]}$$

Then, $y_i \sim N(\mu(\alpha_i) + \mu_0, \Gamma(\alpha_i) + \eta_0)$. Maximum likelihood abundance estimates are thus obtained by solving $$\hat{\alpha}_i = \arg\left\{ \max_{\alpha_i} \left( \frac{1}{|\Gamma(\alpha_i) + \Gamma_0|^{0.5}(2\pi)^{n/2}} \exp\left( \frac{-1}{2}(y_i - \mu(\alpha_i) - \mu_0)^t (\Gamma(\alpha_i) + \Gamma_0)^{-1}(y_i - \mu(\alpha_i) - \mu_0) \right) \right) \right\} \qquad \text{[Eqn. 10]}$$

subject to the constraints c.1, and c.2.a, or c.2.b.

C. Update Class Parameters (UP)

For given abundance estimates, the class parameters, $\Omega = \{(\mu_k, \Gamma_k) | 0 \leq k \leq d\}$, may be estimated by applying the expectation-maximization (EM) algorithm. Let $$\Omega^r = \{(\mu_k^r, \Gamma_k^r) | 0 \leq k \leq d\}$$

denote the estimate of the parameters after the $r^{th}$ iteration of the EM algorithm. Given the abundance values $\{a_{ki} | 1 \leq i \leq N, 1 \leq k \leq d\}$, define $$\delta_i^r = [\Gamma^r(\alpha_i) + c\Gamma_0^r]^{-1}(y_i - \mu^r(\alpha_i) - c\mu_0^r),$$

$$\psi_{ki}^r = \alpha_{ki} \delta_i^r, \quad \overline{\delta}^r = \frac{1}{N} \sum_{i=1}^{N} \delta_i^r, \quad \text{and} \quad \overline{\psi}_k^r = \frac{1}{N} \sum_{i=1}^{N} \psi_{ki}^r.$$

The EM update equations are:

$$\mu_k^{r+1} = \mu_k^r + \Gamma_k^r \overline{\psi}_k^r, \text{ for } 1 \leq k \leq d. \qquad \text{[Eqn. 11a]}$$

$$\mu_0^{r+1} = \mu_0^r + \Gamma_0^r \overline{\delta}^r. (c=1) \qquad \text{[Eqn. 11b]}$$

$$\Gamma_k^{r+1} = \Gamma_k^r - \Gamma_k^r \left( \frac{1}{N} \sum_{i=1}^{N} a_{ki}^2 [\Gamma^r(\alpha_i) + c\Gamma_0^r]^{-1} \right) \Gamma_k^r + \qquad \text{[Eqn. 11c]}$$

$$\Gamma_k^r \left( \frac{1}{N} \sum_{i=1}^{N} \psi_{ki}^r \psi_{ki}^{r^T} - \overline{\psi}_k^r \overline{\psi}_k^{r^T} \right) \Gamma_k^r, \quad \text{for} 1 \leq k \leq d.$$

$$\Gamma_0^{r+1} = \Gamma_0^r - \frac{1}{N} \Gamma_0^r \sum_{i=1}^{N} c^2 [\Gamma^r(\alpha_i) + c\Gamma_0^r]^{-1} \Gamma_0^r + \qquad \text{[Eqn. 11d]}$$

$$\Gamma_0^r \left( \frac{1}{N} \sum_{i=1}^{N} \delta_i^r \delta_i^{r^T} - \overline{\delta}^r \overline{\delta}^{r^T} \right) \Gamma_0^r \cdot (c=1)$$

The class parameters are updated (UP) using the expectation-maximization equations (Eqns. 11) and the current abundance estimates $$\{a_{ik}^i\}.$$

Likelihood increases with each iteration of UA or UP. Thus, a sequence of parameter estimates of increasing likelihood is obtained by the application of a sequence of updates: UA, UP, UA, UP, . . . . The iteration is halted when a convergence criterion is satisfied.

3. Detection Algorithms

Anomaly detection algorithms may be derived from the NCM. An anomaly detection statistic is obtained by estimating the parameters of the data as described above and computing the log-likelihood of the observation, $y_i$, given the parameters:

$$A_{NC}(y_i) = -L(y_i | H_0) = -\frac{1}{2} \log(|\Gamma(\alpha_i) + \Gamma_0|) - \frac{n}{2} \log(2\pi) - \qquad \text{[Eqn. 12]}$$

$$\frac{1}{2}(y_i - \mu(\alpha_i) - \mu_0)^t (\Gamma(\alpha_i) + \Gamma_0)^{-1}(y^i - \mu(\alpha_i) - \mu_0).$$

An anomaly detection procedure is obtained by comparing (12) to a threshold that is obtained from background data.

The class parameters may be updated using a segmented expectation maximization algorithm in place of the expectation-maximization algorithm. In this approach a lower threshold, possibly zero, is placed on the abundance of a class, and only those pixels for which the abundance exceeds the threshold are utilized in the update of the associated class parameters. This approach saves computations and improves the speed of convergence of the parameter estimates.

Rather than solving for the maximum likelihood value of the abundance estimates in the parameter estimation phase of the operation, random samples of the abundance estimates may be generated and these may be used in place of the maximum likelihood estimates in the updating of the class parameters.

Referring to FIG. 1, there is shown a block diagram of an embodiment of a process 100 for detecting anomalies from multidimensional data. 112 Multidimensional data 112 is received at step 120 which estimates background parameters 122 of a normal compositional model from the multidimensional data 112. At step 130, abundance values 132 of the normal compositional model are estimated from the background parameters 122 and multidimensional data 112. Continuing to step 140, an anomaly detection statistic 142 is determined from the multidimensional data 112, background parameters 122, and abundance values 132. At step 150, an observation 152 classification is determined from the multidimensional data 112 as either a background reference or an anomaly from the anomaly detection statistic 142.

FIG. 2 illustrates that step 120, for estimating background parameters, 122 further includes initializing current class parameters 222 and current abundance estimates 224 at step 220, where such current class parameters 222 and current abundance estimates 224 are collectively referenced as signal 226. Next, at step 230, updated abundance estimates 232 are defined from the current abundance estimates 224, current class parameters 222, and multidimensional data 112. Step 240 determines converged class parameter candidates 242 from the updated abundance estimates 232, current class parameters 226, and multidimensional data 112. At step 270, a first affirmative convergence signal 122 is generated if the converged class parameter candidates 242 satisfy first convergence criteria, or step 270 generates a non-convergence signal 274 that is provided to step 230, whereupon step 120 returns to step 230 if the converged class parameter candidates 242 do not satisfy the first convergence criteria.

As shown in FIG. 2, step 240 further includes creating updated current class parameters 252 at step 250 from the current class parameters 222, current abundance estimates 224, and multidimensional data 112. Converged class parameters candidates 242 are provided from step 260 to step 270 if updated current class parameters 252 satisfy second convergence criteria. Step 260 generates a non-convergence signal 264 that is provided to step 250, whereupon step 240 returns to step 250 if updated current class parameters 242 do not satisfy the second convergence criteria.

Referring to FIG. 3, the process of initializing the current class parameters 226 includes: 1) defining a shade point offset value 312 at step 310; 2) defining a shade point covariance value 322 at step 320 from the shade point offset value 312 and multidimensional data 112; 3) defining end members 332 from the shade point value 312 and multidimensional data 112 at step 330; and 4) at step 340, initializing a covariance matrix 226 that is a composite of signals 222 and 224 for each of the end members 332 from the multidimensional data 112.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A method for detecting anomalies from multidimensional data, comprising:
   a) receiving multidimensional data;
   b) estimating background parameters of a normal compositional model from said multidimensional data;
   c) estimating abundance values of said normal compositional model from said background parameters and said multidimensional data;
   d) determining an anomaly detection statistic from said multidimensional data, said background parameters, and said abundance values; and
   e) classifying an observation from said multidimensional data as either a background reference or an anomaly from said anomaly detection statistic.

2. The method of claim 1 wherein estimating background parameters further includes:
   f) initializing current class parameters and current abundance estimates from said multidimensional data;
   g) defining updated abundance estimates from said current abundance estimates, said current class parameters, and multidimensional data
   h) determining converged class parameter candidates from said updated abundance estimates, said current class parameters, and said multidimensional data; and
   i) generating said background parameters if said converged class parameter candidates satisfy first convergence criteria or returning to said defining updated abundance estimates if said converged class parameter candidates do not satisfy said first convergence criteria.

3. The method of claim 2 wherein determining said converged class parameter candidates further includes:
   j) creating updated current class parameters from said current class parameters, said current abundance estimates, and said multidimensional data; and
   k) generating said converged class parameter candidates from said updated current class parameters if said updated current class parameters satisfy second convergence criteria, or returning to said creating updated current class parameters if said updated current class parameters do not satisfy said second convergence criteria.

4. The method of claim 2 wherein said initializing said current class parameters includes:
   l) defining a shade point offset value from said multidimensional data;
   m) defining a shade point covariance value from said shade point offset value and said multidimensional data;
   n) defining end members from said shade point value and said multidimensional data; and
   o) initializing said current class parameters and said current abundance estimates from said end members and said multidimensional data.

5. The method of claim 1 wherein said multidimensional data is detected by an imaging spectrometer.

6. The method of claim 1 wherein said multidimensional data represents surface spectra.

* * * * *